Patented May 29, 1945

2,376,884

UNITED STATES PATENT OFFICE 2,376,884

HYDROQUINONE COMPOSITION

Erwin Schwenk, Montclair, and Edward E. Henderson, Montville, N. J., assignors to Schering Corporation, Bloomfield, N. J., a corporation of New Jersey No Drawing. Application August 7, 1941, Serial No. 405,795

5 Claims. (Cl. 167—90)

The present invention relates to stabilized compositions, such as lotions and creams, for absorbing ultra-violet light and especially the rays that are irritating or dangerous to the skin, and relates in particular to stabilized compositions containing hydroquinone and especially to "sun-tan" cream preparations containing this substance in an amount sufficient to filter out the injurious sun rays to a greater or less degree while permitting the beneficial and tanning rays to pass through to the skin.

Hydroquinone preparations, especially preparations made with a white cream base, have proved to be impractical for the reason that within a short time the preparations became brown as the result of the oxidation of the hydroquinone. Even where the degree of oxidation was not sufficient to impair seriously the effectiveness of the cream preparation, its market value was destroyed by the discoloration.

Attempts have been made to overcome this difficulty by the addition of various reducing agents to the hydroquinone composition but, so far as we are aware, without success. Where inorganic reducing salts, like sodium sulfite, were employed, there was a tendency for the cream or lotion emulsion to break, due to a salting-out effect, causing separation of the components and destruction of the homogeneity of the mixture. Similar efforts with organic reducing agents have likewise proved unavailing. Thus the known reducing sugars have been found to be incapable of preventing oxidation of hydroquinone and are consequently practically useless for stabilizing hydroquinone preparations. Similarly, aldehyde sugars generally, like glucose, and other ordinarily reducing organic substances, like citric acid, have not proved satisfactory.

We have found that laevo-ascorbic or cevitamic acid has the property of inhibiting the oxidation of hydroquinone and at the same time has the essential characteristic that it does not tend to break the emulsion of which the cream or lotion base may be constituted. This stabilizing action is quite remarkable in view of the fact that cevitamic acid has oxidizing functions, being known to take part in physiological oxidizing reactions or to catalyze the same, the substance taking part in oxidizing-reducing processes within the animal body. In view of the fact that ascorbic or cevitamic acid is itself sensitive to oxidation, and is rapidly destroyed in the presence of oxygen, and like its salts ionizes to a considerable degree, its combined capacity for both inhibiting the oxidation of the hydroquinone and leaving the emulsion base or vehicle undisturbed was quite unexpected.

We have found further that the stabilizer or inhibitor may be present in relatively small amount, of the order of catalytic proportions, say about 1-5% (i. e., of the order of catalytic proportions) of the weight of the hydroquinone, which in turn may be present to the extent of about 5% of the whole cosmetic preparation. Smaller amounts than 1% of laevo-ascorbic acid will be effective, while an excess will ordinarily not be detrimental, and as much as 50% or more by weight of the anti-oxidant, based on the weight of hydroquinone, may be employed. We have found that a cream containing 5% of hydroquinone and 0.05% of laevo-ascorbic acid remains white, and the emulsion remains unbroken after many months of storage.

The laevo-ascorbic or cevitamic acid is preferably employed in the free condition; but if desired, the salts, and especially the water-soluble salts thereof, may be employed, such as the sodium, potassium, calcium, and other alkali and alkaline earth metal salts.

The following examples show by way of illustration several satisfactory compositions and methods of compounding the same:

Example 1

| | Grams |
|---|---|
| I. Stearic acid | 20 |
| Cetyl alcohol | 2 |
| Hydroquinone | 5 |
| Laevo-ascorbic acid | 0.25 |
| II. Borax | 1 |
| Sodium carbonate | 2 |
| Glycerine | 6 |
| Water, enough to make | 110 |

Mixture I is molten, then emulsified with a heated solution of II. By stirring until cold, a fine vanishing cream is obtained.

Example 2

| | Grams |
|---|---|
| Tragacanth, powdered | 2 |
| Stearic acid | 12 |
| Glycerin | 6 |
| Hydroquinone | 5 |
| Laevo-ascorbic acid | 0.15 |
| Monohydrated sodium carbonate | 1 |
| Borax | 1 |
| Distilled water, enough to make | 100 |

The water, borax, sodium carbonate, and glycerin are heated until warm. The stearic acid is then added and the whole stirred occasionally. When it has dissolved, the tragacanth is added under vigorous stirring. The mixture is allowed to cool and is stirred until smooth. The cream may be passed through a colloid mill to reduce it to an extremely fine condition.

Example 3

| | Grams |
|---|---|
| Stearic acid | 6 |
| Cocoa butter | 1 |
| Sodium carbonate crystals | 2 |
| Borax | 2 |
| Talc | 16 |
| Glycerine | 6 |
| Alcohol | 4 |
| Hydroquinone | 10 |
| Laevo-ascorbic acid | 0.3 |
| Distilled water, enough to make | 110 |

Melt the stearic acid and cocoa butter, then add, with constant stirring, a solution of the sodium carbonate, borax, and glycerin in hot water, until a soap-like mass has formed. Then incorporate the talc. When cool, mix in the alcoholic solution of hydroquinone, and ascorbic acid; then add any suitable amount of perfume. The sodium carbonate crystals may be replaced by one-half the quantity of the monohydrated salt.

Example 4

| | Grams |
|---|---|
| Stearic acid | 16 |
| Castor oil | 2 |
| Borax | 1–2 |
| Ammonia water | 10 |
| Glycerin | 16 |
| Witch hazel oil | 20 |
| Hydroquinone | 8 |
| Laevo-ascorbic acid | 0.4 |
| Water, enough to make | 100 |

The stearic acid is melted and there are added thereto with constant stirring the castor oil and ammonia. To this mixture there is then added a hot solution of the borax and glycerin. There are finally mixed in the witch hazel oil, hydroquinone, and laevo-ascorbic acid.

Example 5

| | Grams |
|---|---|
| Glycerol stearate | 15.5 |
| Glycerol | 4.5 |
| Spermacetti | 5.0 |
| Citric acid | .2 |
| Mineral oil | 2.0 |
| p-Hydroxy-benzoic acid methyl ester | .12 |
| Water | 67.38 |
| Laevo-ascorbic acid | .2 |
| Hydroquinone | 5.0 |
| Bergamot | .1 |

The spermacetti is first melted and is mixed with the glycerol stearate, glycerol, and mineral oil, with stirring. When this mixture is cool there are added thereto the other ingredients listed above and the mass is mixed until a smooth cream is obtained.

Although our preparations, in their preferred form, are compounded as creams, of the vanishing or non-vanishing varieties, it will be obvious that the hydroquinone and laevo-ascorbic acid may be incorporated in lotion bases and also in powders or wax-sticks which are applied by rubbing upon the skin, by employing suitable vehicles, as will be readily understood by those skilled in the art.

It will be noted that the above formulae are devoid of oils and fats which are oxidizable or decomposable in air and which are likely to impart an unpleasant odor to the mixture. The anti-oxidant is thus all effective to prevent decomposition of the filtering agent itself.

We claim:

1. A composition for use in preventing sunburn of the human skin when exposed to the sun's rays but permitting passage of beneficial and tanning rays to the skin, comprising a hydroquinone-containing preparation containing a vehicle having incorporated therein a quantity of a member of the group consisting of laevo-ascorbic acid and its salts in catalytic proportions, said composition being stable and retaining substantially its normal color over long periods of time.

2. A composition for use in preventing sunburn of the human skin when exposed to the sun's rays but permitting passage of beneficial and tanning rays to the skin, comprising a hydroquinone-containing preparation containing a vehicle having incorporated therein a quantity of laevo-ascorbic acid in catalytic proportions, said composition being stable and retaining substantially its normal color over long periods of time.

3. A composition for use in preventing sunburn of the human skin when exposed to the sun's rays but permitting passage of beneficial and tanning rays to the skin, and containing an emulsified base, hydroquinone, and laevo-ascorbic acid, said composition being stable and retaining substantially its normal color over long periods of time.

4. A composition for use in preventing sunburn of the human skin when exposed to the sun's rays but permitting passage of beneficial and tanning rays to the skin, and containing an emulsified creamy base, hydroquinone, and a quantity of laevo-ascorbic acid about 1–50% of the weight of the hydroquinone, said composition being stable and retaining substantially its normal color over long periods of time.

5. A composition for use in preventing sunburn of the human skin when exposed to the sun's rays but permitting passage of beneficial and tanning rays to the skin, and containing an emulsified creamy base, hydroquinone in an amount approximately 5% of the weight of the base, and a quantity of laevo-ascorbic acid about 1–5% of the weight of the hydroquinone, said composition being stable and retaining substantially its normal color over long periods of time.

ERWIN SCHWENK.
EDWARD E. HENDERSON.